United States Patent
Hargarten

[11] Patent Number: 5,779,020
[45] Date of Patent: Jul. 14, 1998

[54] BEARING ARRANGEMENT FOR ROTATABLY MOUNTING A SHAFT TO THE DRUM OF A CENTRIFUGAL CLUTCH

[75] Inventor: Thomas J. Hargarten, Glendale, Wis.

[73] Assignee: Racing Technology Corporation, Milwaukee, Wis.

[21] Appl. No.: 686,744

[22] Filed: Jul. 26, 1996

[51] Int. Cl.⁶ .................. F16D 43/04; F16C 19/24; F16C 43/04
[52] U.S. Cl. .................. 192/105 R; 192/103 B; 192/110 B; 384/548; 29/434; 29/898.062
[58] Field of Search ................. 192/105 R, 44, 192/105 BA, 103 B, 110 B; 384/548, 560, 572; 29/434, 898, 898.04, 898.062

[56] References Cited

U.S. PATENT DOCUMENTS

| | | | |
|---|---|---|---|
| 2,215,134 | 9/1940 | Rehnberg | 29/434 X |
| 2,691,437 | 10/1954 | Dalrymple | |
| 2,732,051 | 1/1956 | Dalrymple | |
| 2,799,174 | 7/1957 | Pelletier | 192/103 B |
| 2,986,430 | 5/1961 | Banerian | 384/127 |
| 3,026,980 | 3/1962 | Hoff | |
| 3,785,465 | 1/1974 | Johansson | |
| 3,938,633 | 2/1976 | Dietzsch et al. | |
| 3,958,680 | 5/1976 | Armbruster et al. | |
| 3,991,864 | 11/1976 | Müller | |
| 4,227,601 | 10/1980 | Pilatowicz | 192/105 BA |
| 5,103,950 | 4/1992 | Ito et al. | 192/44 X |
| 5,332,317 | 7/1994 | Niwa et al. | 384/548 |

*Primary Examiner*—Richard M. Lorence
*Attorney, Agent, or Firm*—Andrus, Sceales, Starke & Sawall

[57] ABSTRACT

An assembly for rotatably mounting a shaft to a member includes a passage formed in the member within which the shaft is received, and a series of grooves formed in an internal wall which defines the passage. The grooves extend parallel to the axis of the passage and the shaft, and a pin member is received within each groove. Each pin member has a diameter greater than the depth of the groove, so that a portion of the pin member extends beyond the internal wall. The shaft is engaged by the pin members, which function to maintain the shaft out of engagement with the internal wall. The groove and pin member construction provides a bearing between the shaft and the member, without the need and space requirements of a cage typically associated with a conventional preassembled needle bearing package. The invention can be used in any application in which a shaft is to be rotatably mounted to a member, and illustratively may be used in a centrifugal clutch assembly.

17 Claims, 2 Drawing Sheets

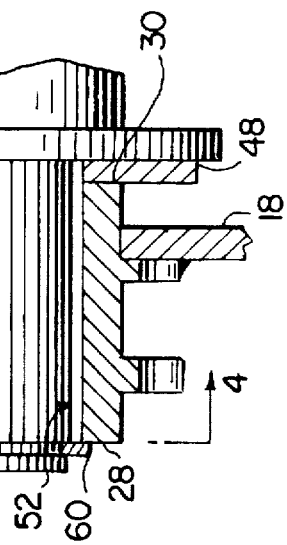
FIG. 2
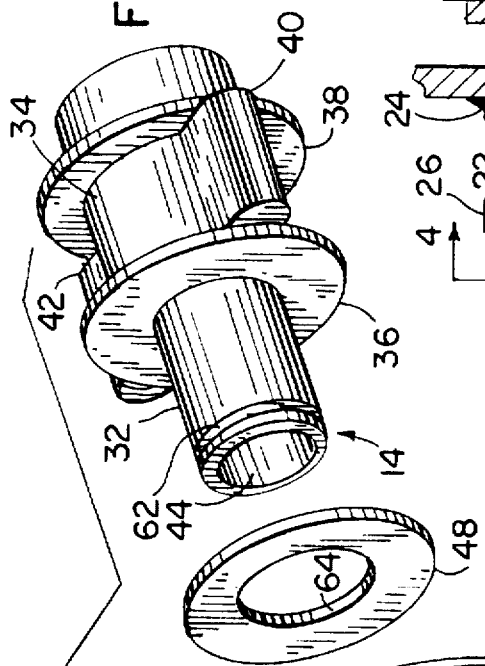
FIG. 3
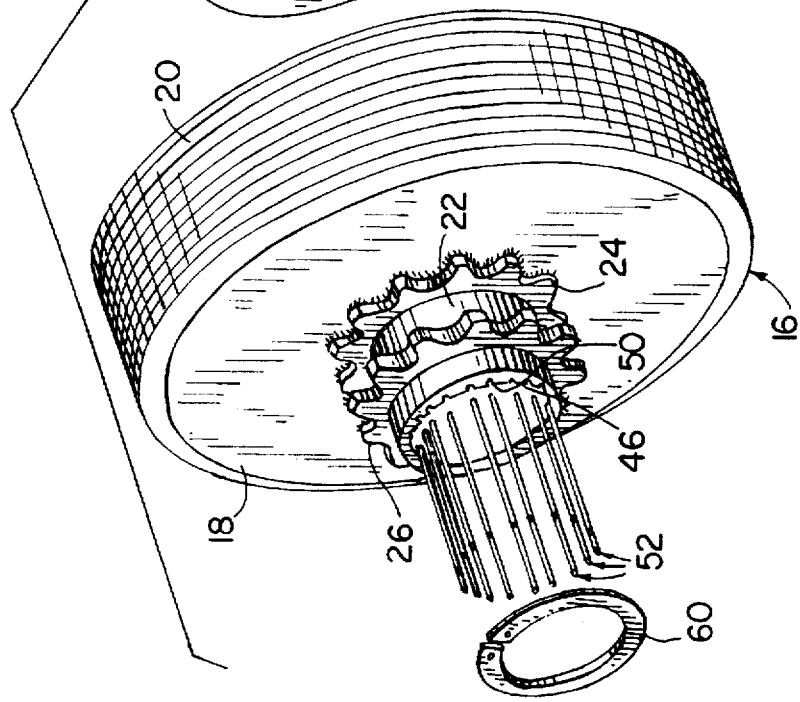

5,779,020

1

BEARING ARRANGEMENT FOR ROTATABLY MOUNTING A SHAFT TO THE DRUM OF A CENTRIFUGAL CLUTCH

BACKGROUND AND SUMMARY OF THE INVENTION

This invention relates to an assembly for rotatably mounting a shaft to a member, and more particularly to an assembly for rotatably mounting a shaft of a centrifugal clutch to the hub of a drum portion of a centrifugal clutch.

In a mechanism in which a shaft is rotatably mounted to a member, such as a centrifugal clutch, it is known to rotatably support the shaft to the member by interposing a separate, preassembled needle bearing assembly or package between the shaft and an internal wall of a passage formed in the member, within which the shaft is received. In the case of a centrifugal clutch, the passage is formed in the hub of a drum member. When using such a separate needle bearing assembly, the shaft and passage sizes must be designed in accordance with the internal and external diameters, respectively, of the needle bearing assembly. This imposes a severe limitation on the design parameters of the centrifugal clutch.

It is an object of the present invention to provide an assembly for rotatably mounting a shaft to a member without the use of a preassembled needle bearing package interposed between the member and the shaft while still providing a bearing function similar to that of a preassembled needle bearing assembly. It is a further object of the invention to minimize the space requirements for providing a bearing-type support between a member and a rotatable shaft. It is a further object of the invention to provide a bearing-type support which is not limited by the dimensions of a preassembled needle bearing package.

In accordance with one aspect of the invention, an assembly for rotatably mounting a shaft to a member includes a series of spaced grooves formed in an internal wall defining a passage in the member, within which the shaft is received, and a pin member disposed within each of the grooves. The pin members extend inwardly of the internal wall into the passage, and engage the shaft so as to maintain the shaft out of engagement with the internal wall. The pin members function to engage the shaft at spaced locations about the periphery of the shaft, and provide a bearing function for accommodating rotation of the shaft relative to the member. In the case of a centrifugal clutch, the passage is formed in a hub which forms a part of a drum assembly, and a selective engagement mechanism is interposed between the shaft and a drum portion of the drum assembly for selectively engaging the shaft with the drum portion when the speed of rotation of the shaft exceeds a predetermined threshold. The hub defines first and second ends, and the grooves extend between the ends of the hub. Stop structure is interconnected with the shaft and located adjacent each end of the hub, to maintain the pin members within the grooves. In a preferred form, each groove is defined by a rounded bottom and a pair of divergent side walls, and each groove side wall is substantially planar and extends between the rounded bottom and the internal wall defining the passage. The pin members are circular in cross-section, and the rounded bottom of each groove has a radius substantially equal to that of the pin member received within the groove. The rounded bottom and side wall of each groove are constructed and arranged such that approximately one-half of the peripheral outer area of the pin side surface is in contact with the rounded bottom.

2

The invention also contemplates a method of rotatably mounting a shaft to a member, incorporating the same essential features as set forth in the foregoing paragraph. In accordance with the method of the invention, the pin members are inserted into the grooves after the shaft has at least been partially received in the passage, so that the shaft functions to maintain the pin members within the grooves as the pin members are being inserted into the grooves. Preferably, the shaft is inserted into the passage in a direction from the second end of the passage toward the first end, and the pin members are inserted into the grooves in an opposite direction, i.e. from the first end of the passage toward the second end. After the shaft is fully received within the passage and the pin members are fully inserted into the grooves, a stop member, such as a snap ring, is engaged with the shaft to prevent outward movement of the pin members from the first end of the hub. A stop member, such as a shoulder, is interconnected with the shaft and is located adjacent the second end of the hub for preventing the pin members from moving outwardly of the second end of the hub, once the shaft is fully assembled to the hub via the snap ring.

Various other features, objects and advantages of the invention will be made apparent from the following detailed description when considered together with the drawings.

BRIEF DESCRIPTION OF THE DRAWINGS

The drawings illustrate the best mode presently contemplated of carrying out the invention.

In the drawings:

FIG. 2 is an exploded isometric view showing the unassembled components of the centrifugal clutch assembly of FIG. 1;

FIG. 3 is a partial sectional view taken along line 3—3 of FIG. 1;

DETAILED DESCRIPTION

Figure 1:
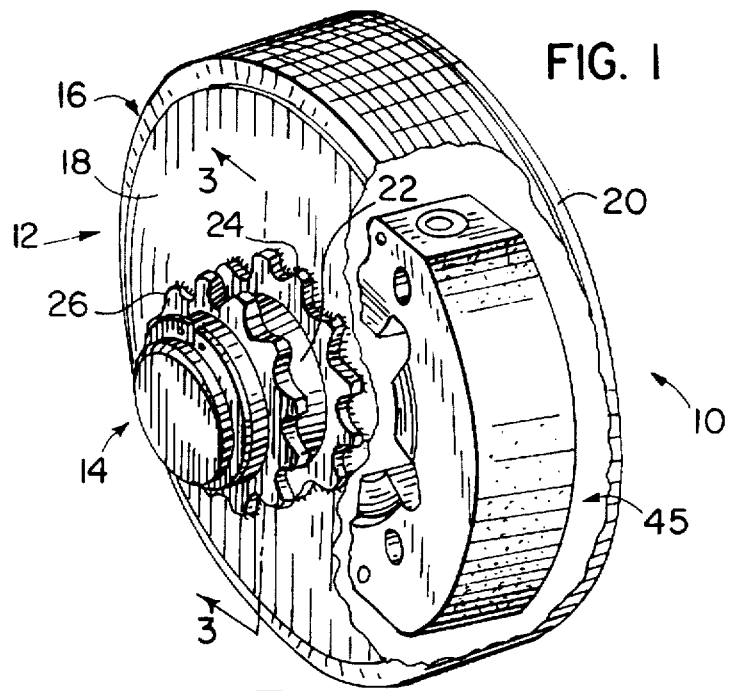
FIG. 1 is an isometric view, with a portion broken away, showing an assembled centrifugal clutch incorporating the rotatable shaft mounting assembly of the present invention.

Referring to FIGS. 1 and 2, a centrifugal clutch assembly 10 incorporating the subject matter of the present invention generally includes a drum subassembly 12 and a shaft subassembly 14. In accordance with known construction, drum subassembly 12 includes a drum member 16 defining an end wall 18 and a side wall 20. A central opening is formed in end wall 18, and a hub 22 extends through the opening. A toothed flange 24 is fixed to end wall 18 by any satisfactory means, such as by welding or the like, to non-rotatably mount hub 22 to end wall 18. A sprocket 26 is mounted to hub 22, and is located between flange 24 and the end of hub 22. As shown in FIG. 3, hub 22 defines an outer end 28 and an inner end 30. Outer end 28 is located outwardly of sprocket 26, and inner end 30 is located inwardly of the inside surface of drum member end wall 18.

Referring to FIGS. 2 and 3, shaft subassembly 14 includes a stub shaft 32 extending from a hub 34. A shoulder plate 36 is interposed between hub 34 and stub shaft 32, located adjacent the outer end of hub 34. A shoulder plate 38 is spaced from shoulder plate 36 and is secured to the outer surface of hub 34, and a pair of wings 40, 42 extend outwardly from hub 34 between shoulder plates 36 and 38.

An axial bore 44 is formed in stub shaft 32 and hub 34, extending between the opposite ends of shaft subassembly 14. Bore 44 receives the output shaft of a prime mover, such as an internal combustion engine, and interengagement structure, such as a key arrangement, is interposed between shaft subassembly 14 and the engine output shaft for imparting rotation to shaft subassembly 14 in response to rotation of the output shaft.

In accordance with conventional construction, a pair of shoes such as 45 (FIG. 1) are mounted to hub subassembly 14, and each shoe includes slot structure within which one of wings 40, 42 is received. A pair of springs located one on either side of hub subassembly 14 are interconnected with the shoes 45 for urging the shoes toward each other.

The general components of centrifugal clutch assembly 10 as described above are known in the art. Centrifugal clutches incorporating such components are available from Racing Technology Corporation of Milwaukee, Wisconsin, the assignee of the present application, under its model numbers AV11-AV23.

Referring to FIGS. 2 and 3, drum hub member 22 includes an internal wall 46 which defines a passage extending between hub ends 28 and 30, within which stub shaft 32 is received when shaft subassembly 14 and drum subassembly 16 are assembled together. As shown in FIG. 3, a washer 48 is disposed between hub end wall 30 and shaft subassembly shoulder plate 36 when shaft subassembly 14 and drum subassembly 16 are assembled together.

In accordance with the present invention, a series of equally radially spaced grooves 50 are formed in internal wall 46, extending between and opening onto hub ends 28 and 30. An elongated pin member 52 is received within each of grooves 50.

Figure 5:
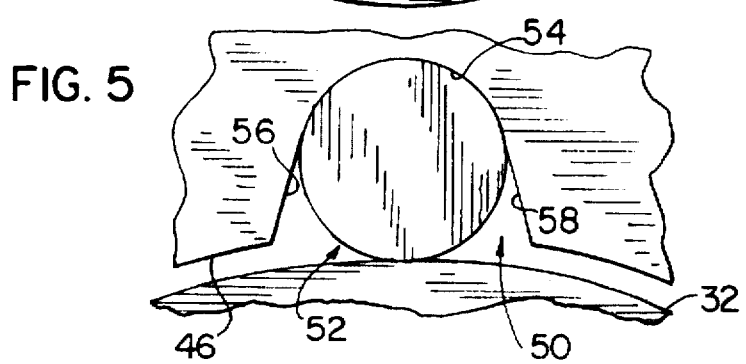
FIG. 5 is an enlarged view of a portion of FIG. 4 showing one of the pins as received within one of the grooves and engagement of the pin with the shaft.

Referring to FIG. 5, each groove 50 includes a rounded bottom surface 54 and a pair of straight, planar side surfaces 56, 58 extending between rounded bottom surface 54 and internal wall 46. Groove side surfaces 56, 58 are divergent in a direction from bottom surface 54 toward internal wall 46, and are tangential to rounded bottom surface 54. In a preferred embodiment, side surfaces 56, 58 define an included angle of approximately 30°.

Each pin member 52 is substantially circular in cross-section throughout its length, as shown in FIG. 5. Rounded bottom surface 54 has a radius substantially equal to that of pin member 52, so that pin member 52 nests into rounded bottom surface 54. Side surfaces 56, 58 and bottom surface 54 are arranged so that slightly less than one-half of the outer peripheral area of each pin member 52 engages bottom surface 54.

Figure 4:
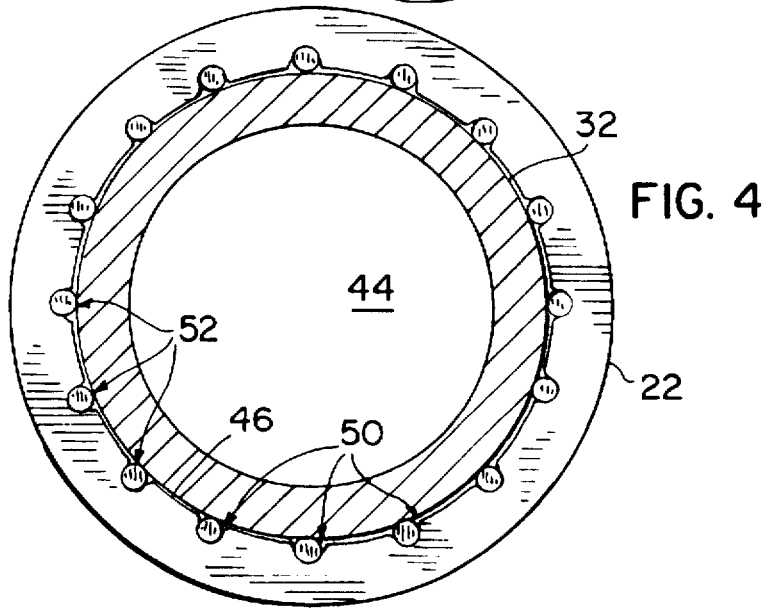
FIG. 4 is a sectional view taken along line 4—4 of FIG. 3.

As shown in FIGS. 4 and 5, each pin member 52 has a diameter greater than the depth of each groove 50, so that pin member 52 extends inwardly of internal wall 46. Each pin member 52 engages the outer surface of stub shaft 32, to maintain stub shaft 32 out of engagement with internal wall 46. This construction provides line contact of each pin member 52 with stub shaft 32 at each groove 50.

The engagement between each pin member 52 and stub shaft 32 provides rotatable mounting of stub shaft 32 to hub 22. Pin members 52 function similarly to a preassembled needle bearing package, in which a cage is received within the passage and disposed between the passage internal wall and the outer surface of stub shaft 32 and in which each needle member is engaged with outer surface 32 to rotatably mount stub shaft 32 to hub 22. The present invention provides advantages over a conventional cage-type needle bearing assembly, in that it eliminates the space required for a separate cage and can be used for any size shaft and passage without regard for the design requirements imposed by use of a preassembled needle bearing package, which are only available in predetermined sizes. In addition, the present invention avoids problems which can result when a conventional preassembled bearing fails, for example, a failed bearing assembly can result in the cage and needle members of the bearing seizing on the shaft 32, preventing further rotation of shaft 32. Such a failure can result simply from the presence of dirt or other foreign material within the cage. With the present invention, there is no cage to fail and seize upon the shaft 32. Further, the presence of dirt or other foreign material between shaft 32 and internal wall 46 will typically not cause a failure of pin members 52. However, even if pin members 52 were to fall out of grooves 50, such as may be caused by failure of snap ring 60, the relatively close tolerance between shaft 32 and internal wall 46 enables hub 22 to function as a bushing to provide continuous rotation of shaft 32 relative to hub 22.

As shown in FIGS. 2 and 3, a snap ring 60 is received within a circumferential groove 62 formed toward the outer end of stub shaft 32 after stub shaft 32 is inserted through hub member 22. Snap ring 60 serves the dual purpose of maintaining stub shaft 32 in engagement with hub 22, and also preventing axial outward movement of pin members 52 within grooves 50.

As shown in FIG. 3, washer 48 includes a central opening 64 having a diameter substantially equal to the diameter of the passage defined by hub internal wall 46 together with twice the depth of each groove 50. With this construction, pin members 52 extend through opening 64 of washer 48 outwardly of hub inner end 30, and are prevented from axial inner movement within grooves 50 by shoulder plate 36.

To assemble centrifugal clutch assembly 10, stub shaft 32 is inserted into the passage in drum assembly hub 22, so that the outer end of stub shaft 32 is located within the passage past hub end 30. If desired, stub shaft 32 can be completely inserted through the entire length of hub 22 as shown in FIG. 3. Pin members 52 are then individually inserted into grooves 50 in a direction from hub end 28 toward hub end 30, and snap ring 60 is then engaged with groove 62.

After assembly, a quantity of any satisfactory lubricant, such as a teflon-based grease, is packed into the void areas defined by grooves 50 and the space between internal wall 46 and the outer surface of stub shaft 32.

In operation, it is believed that pin members 52 rotate within grooves 50 when stub shaft 32 is rotated in response to rotation of the engine output shaft, to provide a bearing between stub shaft 32 and hub 22.

The bearing requirements between stub shaft 32 and hub 22 are relatively minimal, in that stub shaft 22 only rotates relative to hub 22 at relatively low speeds of rotation. Once the speed of rotation of stub shaft exceeds a predetermined threshold, the shoes 45 of centrifugal clutch assembly 10 interengage shaft subassembly 14 with drum subassembly 12, and hub 22 and stub shaft 32 rotate together.

The present invention has been described with respect to a centrifugal clutch assembly, such as 10. However, it is understood that the same groove and pin member construction could be used in any other application in which it is desired to rotatably mount a shaft to a member, and the invention is not limited to use in a centrifugal clutch application.

Various alternatives and embodiments are contemplated as being within the scope of the following claims, particularly pointing out and distinctly claiming the subject matter regarded as the invention.

I claim:

1. In a centrifugal clutch including a rotatable shaft, a drum including a passage within which the rotatable shaft is received, and a selective engagement mechanism interposed between the drum and the shaft for imparting rotation to the drum when the speed of rotation of the shaft exceeds a predetermined threshold, the improvement comprising a plurality of axial grooves formed in a wall defining the passage, and a pin member disposed within each groove, wherein each pin member extends inwardly of the wall into the passage and engages the shaft so as to maintain the shaft out of engagement with the wall.

2. The improvement of claim 1, wherein the passage is defined by a hub interconnected with the drum, wherein the hub defines a pair of opposed ends, and wherein the grooves extend between the ends of the hub.

3. The improvement of claim 2, further comprising stop structure interconnected with the shaft and located adjacent each end of the hub for engaging the pin members for maintaining the pin members within the grooves.

4. The improvement of claim 1, wherein each groove is defined by a rounded bottom and a pair of divergent side walls.

5. The improvement of claim 4, wherein each groove side wall is substantially planar, and extends between the rounded bottom and the wall defining the passage.

6. The improvement of claim 4, wherein each pin member defines a substantially circular cross-section, and wherein the rounded bottom of each groove has radius substantially equal to that of the pin member.

7. The improvement of claim 6, wherein the rounded bottom and the side walls of each groove are constructed and arranged such that slightly less than one-half of the peripheral area of the pin member is in contact with the rounded bottom.

8. An assembly for rotatably mounting a shaft to a member, comprising:
   a passage formed in the member into which the shaft is received, the passage being defined by an internal wall;
   a plurality of grooves formed in the internal wall; and
   a plurality of separate pin members, wherein each pin member is disposed within one of the grooves separately from and without connection to the adjacent pin members, wherein the pin members extend inwardly of the internal wall into the passage so as to engage the shaft to maintain the shaft out of engagement with the internal wall and to provide relative rotation between the shaft and the member.

9. A method of rotatably mounting a shaft to a member, comprising the steps of:
   forming a passage in the member, the passage being defined by an internal wall and having a diameter greater than the diameter of the shaft;
   forming a series of grooves in the internal wall;
   placing a pin member in each groove separate from placement of pin members in the remaining grooves, wherein the grooves and the pin members are arranged such that a portion of each pin member projects past the passage internal walls; and
   inserting the shaft into the passage, wherein the pin members contact the shaft to maintain the shaft out of engagement with the internal wall.

10. A method of rotatable mounting a shaft to a member, comprising the steps of:
   forming a passage in the member, the passage being defined by an internal wall and having a diameter greater than the diameter of the shaft;
   forming a series of grooves in the internal wall;
   placing a pin member in each of the grooves, wherein the grooves and the pin member are arranged such that a portion of each pin member projects past the passage internal walls; and
   inserting the shaft into the passage, wherein the pin members contact the shaft to maintain the shaft out of engagement with the internal wall; wherein the step of placing the pin members into the grooves is carried out after at least a portion of the shaft is received within the passage.

11. The method of claim 10, wherein the member defines first and second ends between which the passage extends, wherein the grooves are formed so as to open onto at least the first end of the member and wherein the shaft is inserted into the passage in a direction from the second end of the member toward the first end, and wherein the pin members are inserted into the passages in a direction from the first end of the member toward the second end of the member after the shaft has been at least partially received within the passage and is disposed over the grooves.

12. The method of claim 11, further comprising the step of securing a stop member to the shaft after insertion of the pin members into the grooves for maintaining the pin members within the grooves.

13. The assembly of claim 8, wherein each groove defines a bottom and a pair of side walls extending between the groove bottom and the passage, and wherein each pin member is in engagement with the groove bottom and with the shaft to rotatably support the shaft within the passage and to maintain the shaft out of engagement with the internal wall.

14. An assembly for rotatably mounting a shaft to a member, comprising:
   a passage formed in the member into which the shaft is received, the passage being defined by an internal wall;
   a plurality of grooves formed in the internal wall, wherein each groove includes a bottom and a pair of side walls extending between the groove bottom and the passage; and
   a plurality of pin members, wherein each pin member is disposed within one of the grooves in engagement with the groove bottom, wherein each pin member extends inwardly of the internal wall into the passage and engages the shaft to maintain the shaft out of engagement with the internal wall.

15. The assembly of claim 14, wherein each groove defines a rounded bottom and the side walls extend divergently between the groove bottom and the passage.

16. The assembly of claim 15, wherein each pin member defines a substantially circular cross-section, and wherein the rounded bottom of each groove has a radius substantially equal to that of the pin member.

17. An assembly for rotatably mounting a shaft to a member, comprising:
   a passage formed in the member into which the shaft is received, the passage being defined by an internal wall and opening onto an end wall defined by the member;
   a plurality of grooves formed in the internal wall, wherein the grooves open onto the end wall defined by the member;
   a plurality of pin members, wherein the pin members are disposed within the grooves and extend inwardly of the internal wall into the passage so as to engage the shaft and maintain the shaft out of engagement with the internal wall; and
   a stop member mounted to the shaft and located adjacent the end wall defined by the member for maintaining the pin members within the grooves.

* * * * *